US012652437B2

(12) United States Patent
Wu et al.

(10) Patent No.: US 12,652,437 B2
(45) Date of Patent: Jun. 9, 2026

(54) METHOD FOR FAST STARTING UP TELEVISION DISPLAY FUNCTION AND TELEVISION SYSTEM

(71) Applicant: REALTEK SEMICONDUCTOR CORP., Hsinchu (TW)

(72) Inventors: Yen-Hsing Wu, Hsinchu (TW); Chih-Ming Tsao, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 130 days.

(21) Appl. No.: 18/369,270

(22) Filed: Sep. 18, 2023

(65) Prior Publication Data

US 2024/0098336 A1 Mar. 21, 2024

(30) Foreign Application Priority Data

Sep. 19, 2022 (TW) .................................. 111135262

(51) Int. Cl.
*H04N 21/443* (2011.01)
*H04N 21/4363* (2011.01)

(52) U.S. Cl.
CPC ... *H04N 21/4432* (2013.01); *H04N 21/43635* (2013.01)

(58) Field of Classification Search
CPC ......... H04N 21/4432; H04N 21/43635; H04N 21/4854
USPC ....................................................... 348/730
See application file for complete search history.

(56) References Cited

U.S. PATENT DOCUMENTS

| | | | | |
|---|---|---|---|---|
| 2005/0015215 A1* | 1/2005 | Zhang | ................... | G06F 9/4418 |
| | | | | 702/119 |
| 2018/0124457 A1* | 5/2018 | Chen | .................. | H04N 21/4432 |
| 2019/0268654 A1* | 8/2019 | Huang | ............... | H04N 21/4432 |
| 2022/0358874 A1* | 11/2022 | Huang | ...................... | G06F 3/13 |

FOREIGN PATENT DOCUMENTS

| | | |
|---|---|---|
| CN | 110324714 A | 10/2019 |
| CN | 110557682 A | 12/2019 |

* cited by examiner

*Primary Examiner* — John W Miller
*Assistant Examiner* — Omer Khalid
(74) *Attorney, Agent, or Firm* — Li & Cai Intellectual Property (USA) Office

(57) ABSTRACT

A method for fast starting up a television display function and a television system are provided. In the method, when a television device is powered on, the television system operated in the television device performs a hardware initialization and a fast start-up procedure. In the fast start-up procedure, a set of picture-quality parameters is loaded to the television system from a storage circuit. Display parameters of the television device are configured according to the picture-quality parameters, accordingly, a display of the television device starts to display a picture. The picture can be produced from image signals received through an external source such as a high-definition multimedia interface (HDMI) or a Display Port, a type-C interface, or other sources of the television device. The picture-quality parameters are collected and stored in the storage circuit during operation of the television system after the operating system booting procedure is completed.

12 Claims, 6 Drawing Sheets

METHOD FOR FAST STARTING UP TELEVISION DISPLAY FUNCTION AND TELEVISION SYSTEM

CROSS-REFERENCE TO RELATED PATENT APPLICATION

This application claims the benefit of priority to Taiwan Patent Application No. 111135262, filed on Sep. 19, 2022, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for starting up a television, and more particularly to a method for fast starting up a television display function that adopts previously-collected picture-quality parameters in a fast start-up procedure and a television system.

BACKGROUND OF THE DISCLOSURE

A smart TV includes a built-in operating system that has multiple functions. In addition to being capable of playing digital or analog television programs and having functions for connecting with various audio and video signal sources as in a traditional television, the smart TV mainly integrates the functions of a set top box and certain parts of a computer. Furthermore, the smart TV provides a network connection service and software functions. For example, a user can listen to music, watch network streaming videos, check network messages, and play network games on the smart TV.

Conventionally, an existing smart TV generally has an operating system such as Android® that is used in a mobile device. Therefore, when the smart TV is activated, especially when the smart TV is activated via a cold boot process by powering on the smart TV from a power-off state, booting up the operating system completely usually takes some time, so as to enable the various functions of the smart TV to be used.

In a start-up procedure of the existing smart TV, the procedure starts from powering on the smart TV and the start-up procedure firstly sets up the display parameters, especially the picture quality parameters. The picture quality parameters include one or any combination of a maximum screen brightness setting, a minimum screen brightness setting, high dynamic range parameters, screen saturation chromaticity parameters, screen gamma curve parameters, screen delay parameters, a screen maximum supporting frequency, a screen definition, a dynamic contrast, a number of regions applied to a local dimming screen backlight, color conversion parameters, and an amplification factor. Next, the start-up procedure enters an operating system booting procedure, and shows a starting picture after the initialization of various hardware peripherals and setting of the picture quality parameters are completed.

Accordingly, the existing smart TV take tens of seconds or even one minute for reaching a stable state from the cold boot process, so that optimized setting and picture quality can be achieved. During the booting procedure of the smart TV, the possible variations of the picture parameters may affect the visual experience of the user.

SUMMARY OF THE DISCLOSURE

For addressing the issues that the conventional television system (i.e., a smart TV) requires a long time to reach a stable state for use after a cold boot process, the present disclosure provides a method for fast starting up television display function and a television system. In the method, a fast start-up procedure is provided, in which the display function can be firstly enabled with pre-stored picture-quality parameters, and an operating system booting procedure is running simultaneously until the booting procedure is completed.

According to one embodiment of the television system that performs the method for fast starting up television display function, the television system mainly include a processing circuit, a display module, and a storage circuit. The storage circuit is configured to store the picture-quality parameters. In the method, a hardware initialization process is activated after the television device is powered on. Furthermore, a fast start-up procedure is started, in which the picture-quality parameters are loaded from the storage circuit, and the picture-quality parameters are applied to the television device for displaying the picture with the picture-quality parameters.

Preferably, the procedure of hardware initialization of the television device includes initializing an I/O interface of the television device, a display, and a storage implemented by the storage circuit.

Further, the fast start-up procedure includes a step for detecting a signal source of a high-definition multimedia interface (HDMI) connected with an I/O interface. The abovementioned picture is generated from image signals received through the HDMI.

According to one embodiment of the present disclosure, the picture-quality parameters recorded in the storage circuit are parameters setting the display of the television device, and the picture-quality parameters can be one or any combination of a maximum screen brightness setting, a minimum screen brightness setting, high dynamic range parameters, screen saturation chromaticity parameters, screen gamma curve parameters, screen delay parameters, a screen maximum supporting frequency, a screen definition, a dynamic contrast, a number of regions applied to a local dimming screen backlight, color conversion parameters, and an amplification factor.

Further, the parameter settings stored in the storage circuit include the parameters configured by a user for a user interface displayed by the television device.

Preferably, in a process for generating the picture-quality parameters stored in the storage circuit, after the television device completes the operating system booting procedure and is operated, a parameter-collecting program is performed to collect the current picture-quality parameters, and the picture-quality parameters are stored to the storage circuit. The picture-quality parameters are applied to the television system when the television system is re-activated.

In one embodiment of the present disclosure, the operating system booting procedure includes enabling a kernel of the operating system and operating services provided by the operating system after the operating system booting procedure is completed, so that a smart TV is implemented.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
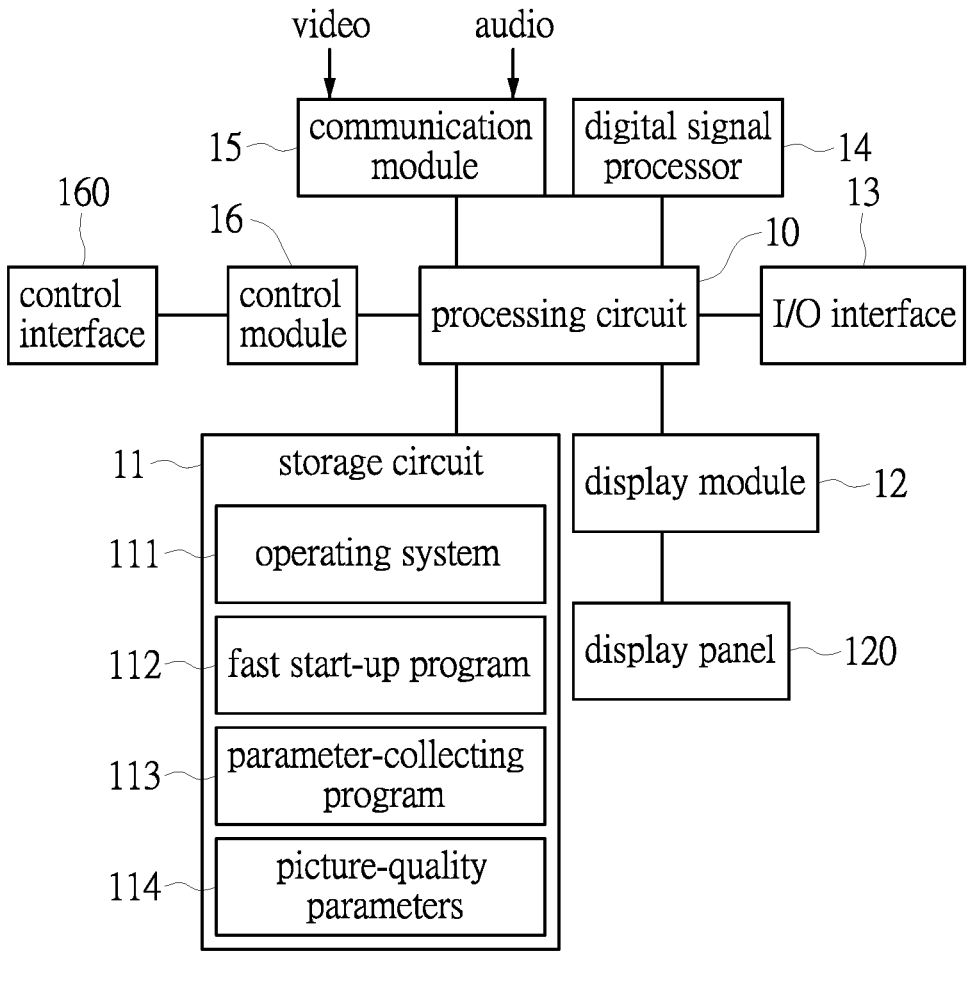
FIG. 1 is a schematic diagram depicting a television system that implements fast starting up television display function according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The booting of a television can be divided into an AC (alternating current) booting and a DC (direct current) booting. The DC booting (also called as a warm boot process) of the television indicates a booting procedure under a standby status of a television system. When the television system enters the standby status after being booted, the television system in the DC booting can be activated in a short time after an activation command is received. On the other hand, the AC booting indicates a booting procedure when the television system is activated after the television is powered off That is, in the AC booting, when the television is powered on, the television system reloads an operating system and performs initialization.

The present disclosure relates to a method for fast starting up television display function and a system. In the method, the booting procedure of the television system is divided into two procedures that include a fast start-up procedure for activating a television display function of the television system and a procedure for activating an operating system of the television. The procedure for activating the operating system of the television, e.g., a smart TV, is a standard booting procedure that generally takes a longer time to complete the booting and then enters a stable state of operation. One of the objectives of the method for fast starting up television display function of the present disclosure is to quickly enter an applicable state and display an initial picture after a cold boot process from powering on the television. Therefore, the method of the present disclosure allows the television system to provide the initial picture before the booting is completed, furthermore, the booting procedure of the operating system can be run as a background procedure at this time.

The television system that operates the method for fast starting up television display function can be referred to in a schematic diagram of FIG. 1, which shows modules implemented by hardware or software of the television system of a television device.

A television system mainly includes a processing circuit 10 and various circuit components electrically coupled to the processing circuit 10. The circuit components are such as a display module 12 and a storage circuit 11. The processing circuit 10 respectively performs the fast start-up procedure and the operating system booting procedure via different threads or different cores. The display module 12 is a driving circuit for controlling operation of a display panel 120. The display module 12 is to display a picture by the display panel 120 according to display parameters and image signals of the processing circuit 10, and especially according to the display parameters configured by picture-quality parameters. The storage circuit 11 can be implemented by a flash memory, an electrically erasable programmable read-only memory (EEPROM), or other types of memory. The storage circuit 11 is for storing the picture-quality parameters for fast starting up television display function.

According to one embodiment of the present disclosure, the storage circuit 11 is for storing programs of an operating system 111 of the television system, a fast-booting program 112 for performing the fast start-up procedure, a parameter-collecting program 113 that collects picture-quality parameters 114 when the television system is in operation and collects parameters of the user interface set by a user, and the picture-quality parameters 114. It should be noted that, the storage circuit 11 can be any type of memory in the television system, a memory block of any type of storage device, or a storage device other than the memory required for operating the television system.

The display panel 120 is driven by the display module 12, and is a display element of the television device. According to one of the objectives of the method for fast starting up television display function, the display of the television device can be for displaying an image of a specific signal source after the fast start-up procedure is completed, without waiting for the operating system of the television system to finish booting procedure.

The circuit components that are electrically coupled with the processing circuit 10 include an input/output (I/O) interface 13 that can be any of various types of audiovisual signal connection interfaces. The audiovisual signal connection interface can be a high-definition multimedia interface (HDMI), a Display Port, or a digital visual interface (DVI). Furthermore, interfaces such as a universal serial bus (e.g., type-C USB), an audio interface, and other wired or wireless connection interfaces can be included. For the television device, a communication module 15 receives signals from an external signal source via a wired or wireless connection. The signals can be video and audio as shown in the figure. A digital signal processor 14 is for decompressing and decoding the video and the audio received by the communication module 15 of the television system. A control module 16 is used to process the control instructions generated by the user manipulating a control interface 160, so as to generate the instructions for controlling the television system. The user can configure the picture quality of the display and the user interface displayed on the display via the control interface 160. The relevant setting parameters can be collected by the parameter-collecting program 113 when the television system is in operation, and the setting parameters are stored in the storage circuit 11.

The television system depicted in the present disclosure is for implement the television system of a smart TV and has an operating system (e.g., an Android® operating system) operated therein. In addition to having functions of traditional digital or analog television or various external audiovisual apparatuses, the smart TV can provide various audiovisual contents, gaming services, and shopping services that are obtained via network connections. Further, the smart TV can have various application programs to be operated thereon.

However, after powering on the television device, similar to a common computer system, the television device needs a certain period of time to complete the booting procedure and enter a stable status for operation. According to one of the objectives of the method for fast starting up television display function, before the general operating system booting procedure, the television is first booted via a fast start-up procedure and the hardware elements are initialized. The television device can activate the functions of the display, for example, for applying the pre-stored picture-quality parameters onto the images so that the images at this phase meet requirements of the user. Therefore, the pictures can be consistent in terms of quality with the images after the operating system booting procedure is completed.

The picture-quality parameters collected by the television system and stored in the storage circuit 11 are primarily the parameters setting of the display of the television device. In addition to the default display parameters such as a resolution, a maximum brightness, and a chromaticity coordinates of a display panel, the picture-quality parameters can be one or any combination of a maximum screen brightness setting, a minimum screen brightness setting, high dynamic range parameters, screen saturation chromaticity parameters, screen gamma curve parameters, screen delay parameters, a screen maximum supporting frequency, a screen definition, a dynamic contrast, a number of regions applied to a local dimming screen backlight, color conversion parameters, and an amplification factor. Furthermore, in addition to the parameters that will affect the picture quality, the parameters stored in the storage circuit 11 also include the parameters setting configured by a user for a user interface (UI) displayed on the television device.

In should be noted that, with respect to the number of regions applied to a local dimming screen backlight, the local dimming technology may be applied to a high-end display for increasing contrast of the display. For example, the local dimming technology allows the user to have a darker visual sensation since the backlight of dark areas of a picture displayed on the display is configured to be lowered. Conversely, the backlight of light areas of the picture displayed on the display is increased for increasing the contrast of the display. Because different backlight are respectively applied for different areas of the picture, the local dimming technology requires less power consumption, and can effectively reduce power consumption of the display.

Figure 2:
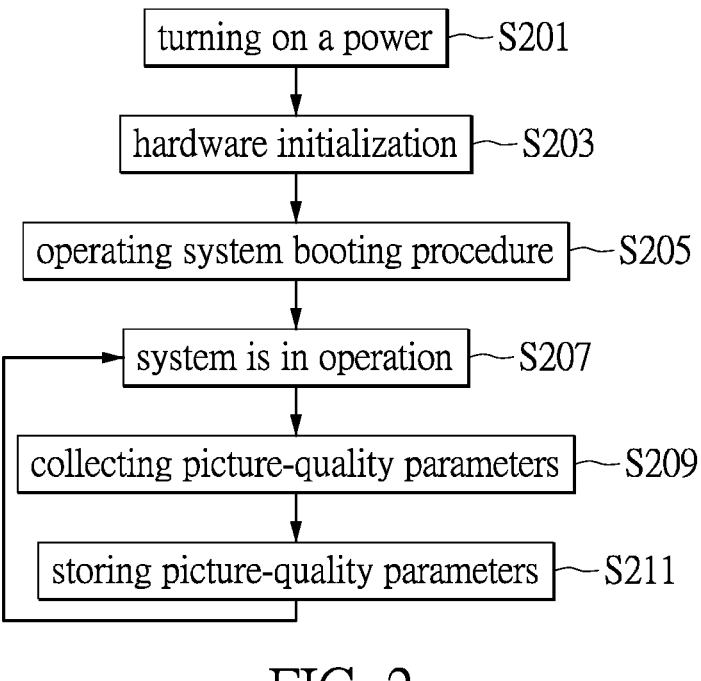
FIG. 2 is a flowchart illustrating a process of collecting parameters in a method for fast starting up television display function according to one embodiment of the present disclosure.

According to one embodiment of the present disclosure, the picture-quality parameters recorded in the storage circuit are obtained by referring to in a process of collecting parameters as shown in the flowchart of FIG. 2 in the method for fast starting up television display function.

In the process of collecting the picture-quality parameters, the television device is powered on (step S201) and is booted up from a cold boot process or a warm boot process. Afterwards, the hardware initialization is in progress (step S203) when the television device is in the booting procedure. For example, a chip timing of a system on a chip (SoC) is initialized, and an I/O interface, a display, and the storage circuit of the television device are also initialized, furthermore, an operating environment is accordingly initiated. When the initialization performed on the hardware of the display and specific circuits of the television device is completed, a start-up picture is displayed and a start-up sound is played at this phase.

The process then enters an operating system booting procedure (step S205). The operating system booting procedure includes enabling a kernel of an operating system for driving the hardware. After the operating system booting procedure is completed, the television system is operated under the operating system and is able to provide various audiovisual contents and perform various services that embody a smart TV. In the process of collecting the picture-quality parameters, the user can configure display parameters such as the abovementioned picture-quality parameters and the parameters relating to user interfaces.

When the television system is in operation, the operating system performs a parameter-collecting program (step S207) for collecting the picture-quality parameters that are currently used under a stable state. The picture-quality parameters include default parameters of the television system or parameters configured by the user, and the parameters configured by the user for the user interfaces of the television system (step S209). Afterwards, the parameters are stored to the storage circuit (step S211). In the process of collecting the picture-quality parameters, the picture-quality parameters by which the television system operates for a certain periods of time and reaches a state approved by the user are collected. The state approved by the user indicates that a picture displayed on the display of the television device is adjusted by the user or is consistent with the default parameters of the television system. The above steps S207 to step S211 are repeated when the television system is in operation, so as to continuously or periodically check whether or not the present picture-quality parameters should be stored.

The picture-quality parameters being collected through the process as shown in FIG. 2, or including the parameters of user interfaces, are stored. After a cold boot process of the television system, the stored parameters allow the television system in a fast start-up procedure to display a picture that is consistent in terms of picture quality with the picture displayed after the booting procedure of the television system is completed.

Figure 3:
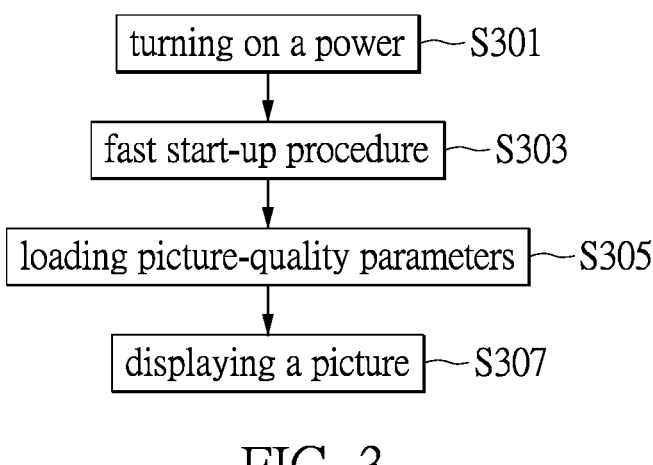
FIG. 3 is a flowchart illustrating a process of loading picture-quality parameters in the method for fast starting up television display function according to one embodiment of the present disclosure.

Reference is made to FIG. 3, which is a flowchart illustrating a process of loading the picture-quality parameters in the method for fast starting up television display function according to one embodiment of the present disclosure.

Firstly, the television device is powered on from a cold boot process (step S301). After the hardware of the television device is initialized, a booting program is loaded from a specific storage such as the storage circuit to a memory of the television system. The television device enters a fast start-up procedure after a processing circuit performs the booting program (step S303). In the fast start-up procedure, the picture-quality parameters such as the display parameters mentioned in the above embodiments are loaded from the storage circuit to the memory of the television system (step S305). The picture-quality parameters are for configuring the display parameters of the television device, and the television display displays the picture according to the display parameters (step S307). For example, the picture to be displayed in the fast start-up procedure can be a fast start-up picture, or a picture provided from a specific signal source.

In the fast start-up procedure, when the fast starting up television display function is activated, the I/O interface of the television device can be detected in the fast start-up procedure and then initialized. For example, a source of an external player can be detected via an HDMI port, a Display Port (DP), a type-C USB interface, or other types of signal sources, and the image signals therefrom can be received, e.g., via the HDMI port, and the image signals are for generating the picture to be displayed.

In particular, in one embodiment of the present disclosure, a processing circuit of the television system uses different threads or different cores to perform the fast start-up procedure and the operating system booting procedure operated in the television system. Therefore, when the television system is in the fast start-up procedure, the television system operates the operating system booting procedure. When the operating system booting procedure is completed, the setting for the display of the television device is also completed. Accordingly, the display parameters can be transmitted to and processed by the operating system after the booting procedure via an application programming interface (API).

Figure 4:
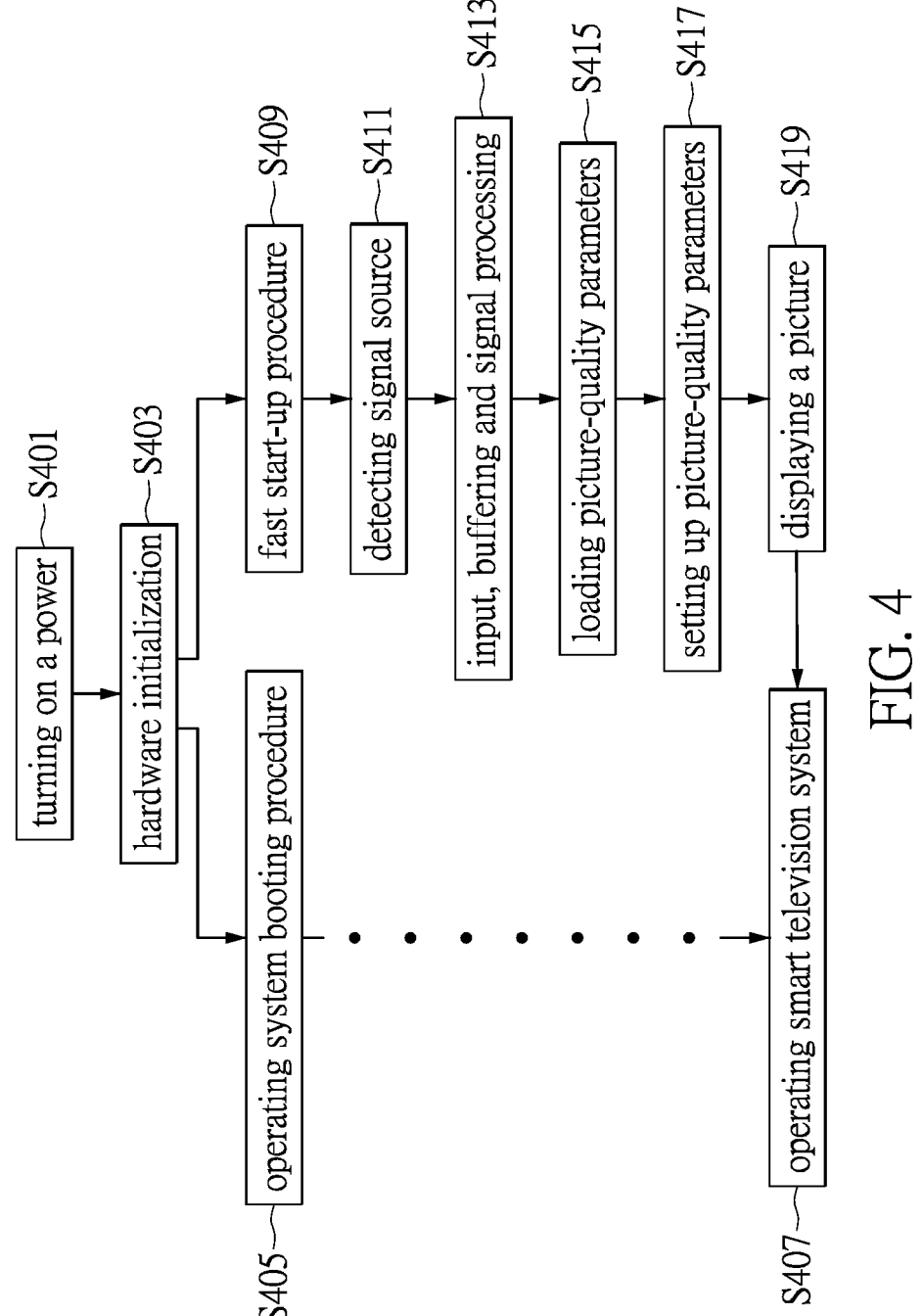
FIG. 4 is a flowchart illustrating the method for fast starting up television display function according to one embodiment of the present disclosure.

In general, reference is made to FIG. 4, which is a flowchart illustrating the method for fast starting up television display function according to one embodiment of the present disclosure. In the method, after the television device is powered on (step S401), a hardware initialization is performed (step S403). At this time, one of threads of the processing circuit performs an operating system booting procedure (step S405); on the other hand, a fast start-up procedure is in progress (step S409).

Before the operating system booting procedure is completed (step S407), a signal source is detected in the fast start-up procedure (step S411). The signal source is such as the signal source linking to the high-definition multimedia interface. Initial operations including inputting the signals, buffering the signals, and processing the signals (step S413) are performed. Processing the signals includes scaling the images, adjusting a frame rate, and adjusting display settings of a display panel. Next, the picture-quality parameters are loaded from a specific storage (step S415). The picture-quality parameters include static parameters that remains unchanged from manipulation of the user, and the parameters that can be changed by the user. The picture-quality parameters also include the parameter settings of the user interface. The picture-quality parameters are referred to for setting up the display parameters of the display of the television device (step S417). Therefore, the television device can display the picture that is received via the high-definition multimedia interface (step S419).

Figure 5:
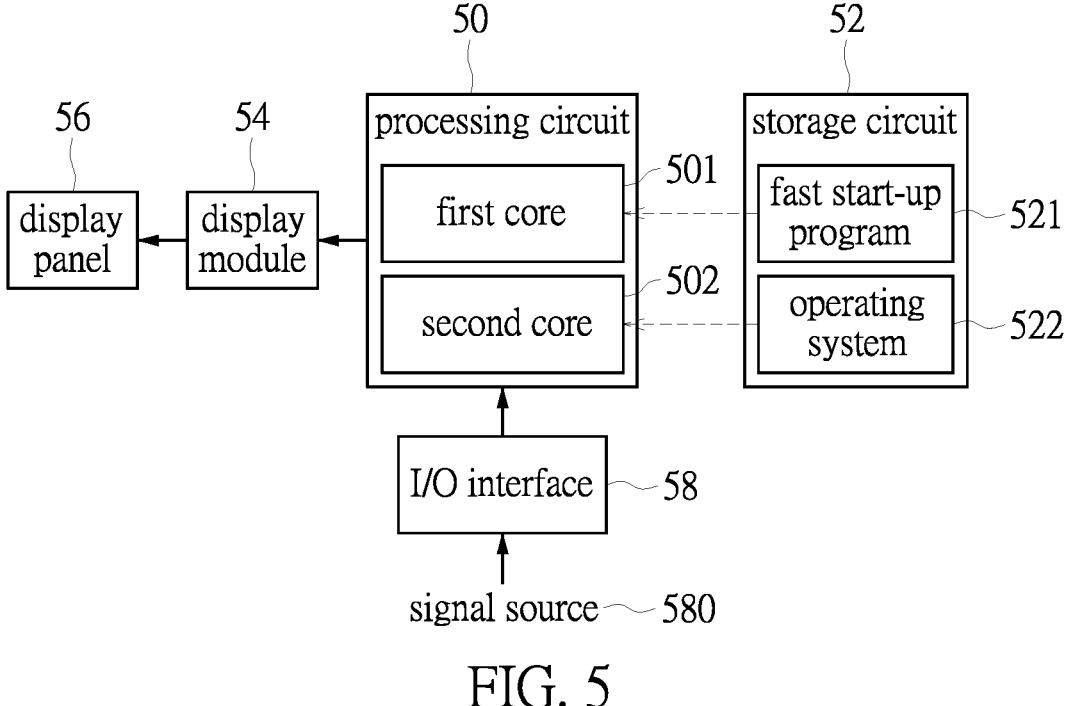
FIG. 5 is a schematic diagram depicting a circuit framework of a system performing the method for fast starting up television display function according to one embodiment of the present disclosure.

A framework of a processor of the television system can be referred to in FIG. 5, which is a schematic diagram of a circuit framework of the television system.

A processing circuit 50 is preferably a multi-core processor that allows different cores, e.g., a first core 501 and a second core 502, to respectively perform the fast start-up procedure and the operating system booting procedure. Peripheral circuit components are such as a storage circuit 52 that stores a fast start-up program 521 and an operating system 522, and a display module 54 and a display panel 56 of the television device. The television device is connected with a signal source 580 via an I/O interface 58.

When the television device is powered on, for example, the first core 501 performs the fast start-up program through the process as shown in step S409 to S419 of FIG. 4. The fast start-up program includes initializing hardware such as the I/O interface 58, the display module 54, and the storage circuit 52, detecting the input signals, and performing image processing and image output, so that the functions that are activated only when the operating system completes the booting procedure in the conventional system can be activated in the fast start-up procedure. Furthermore, the second core 502 is for performing a normal operating system booting procedure, such as step S405 to step S407 of FIG. 4.

Figure 6:
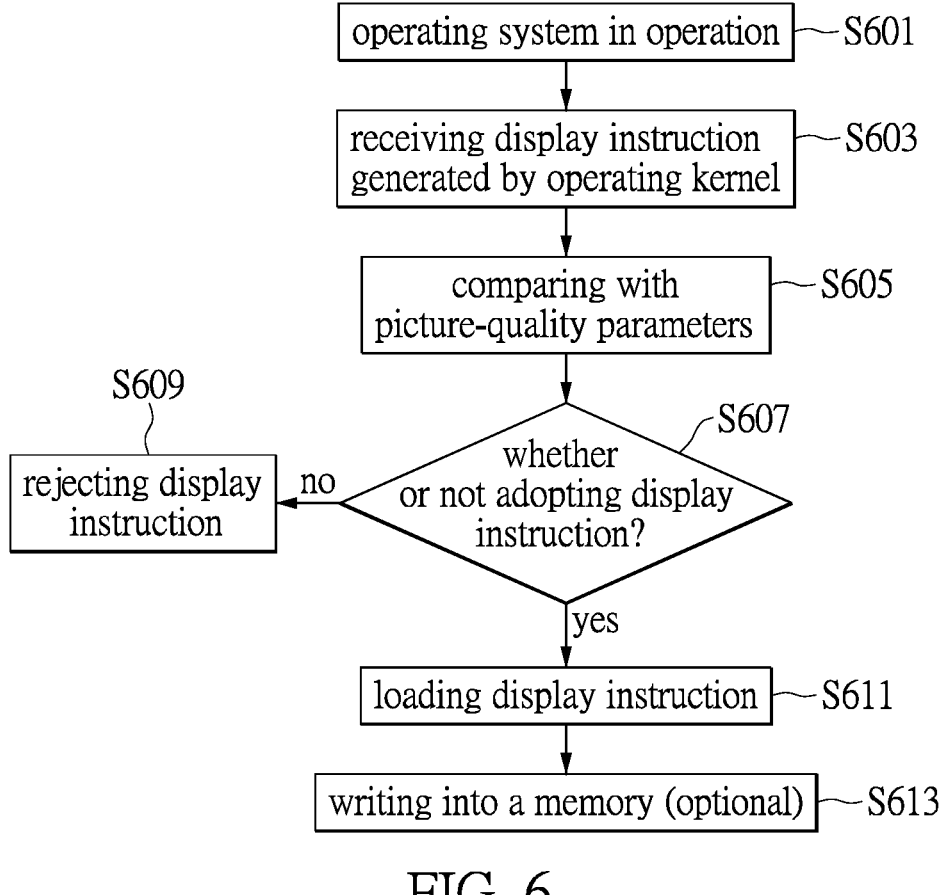
FIG. 6 is a flowchart illustrating a process for confirming a kernel command in the method for fast starting up television display function in one embodiment of the present disclosure.

According to one embodiment of the present disclosure, through the process as illustrated in FIG. 4, when the television system completes the operating system booting procedure, the television system enters a normal operating state of the system. The television system transmits the display parameters in the fast start-up procedure to the operating system that has been booted completely via an application programming interface (API). At this time, when the kernel of the operating system issues a display instruction, a checking program can be performed to determine whether or not the display instruction affects the picture-quality parameters. Reference is made to FIG. 6, which is a flowchart illustrating a process of confirming a kernel command in the method for fast starting up television display function according to one embodiment of the present disclosure.

In the process, when the television system completes the booting procedure and starts to operate an operating system (step S601), under a specific circumstance, the kernel of the operating system may issue a display instruction (step S603). At this time, the television system compares the current picture-quality parameters with certain determination thresholds set by the system through a determination program (step S605) so as to determine whether or not to adopt the display instruction (step S607). The determination can be based on the picture-quality parameters written in the memory of the system in the fast start-up procedure so as to determine whether or not the display instruction is adopted according to whether or not the picture needs to be blacked out or meets abnormal flicking.

If it is determined that the display instruction issued by the kernel of the operating system is not adopted, the display instruction is rejected (step S609). That is, the current picture-quality parameters are not replaced and the process returns to step S601. Otherwise, if it is determined that the display instruction issued by the kernel of the operating system is adopted, the display instruction is configured to be loaded (step S611). The picture-quality-parameters generated by the display instruction can be written to a specific memory (step S613).

In conclusion, according to the above embodiments relating to the method for fast starting up television display function and the television system that performs the method, for quickly entering a display function of the television device, the main approach of the present disclosure is to load a fast start-up program into a booting program, and the fast start-up program allows the television system to operate a fast start-up procedure and an operating system booting procedure that implements a smart TV at the same time. More particularly, the picture-quality parameters are pre-loaded into the fast start-up procedure in order to display a picture in the fast start-up procedure, and then display another picture from a specific signal source after the fast start-up procedure is completed, and the quality of the pictures can be consistent with the picture quality after the operating system is booted completely. Therefore, the television system allows the user to quickly use the display function and see a high-quality picture without waiting for the operating system to be booted completely.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for fast starting up a television display function, comprising:

turning on a power of a television device, wherein the television device has a television system that performs hardware initialization of the television device;

performing a fast start-up procedure and an operating system booting procedure by a processing circuit using different threads or different cores in the television system including loading picture-quality parameters from a storage circuit; and setting up display parameters of the television device with the picture-quality parameters so as to display a picture;

wherein, after the television device completes the operating system booting procedure that enables a kernel of an operating system and is operated, the picture-quality parameters recorded in the storage circuit is formed by operating a parameter-collecting program for collecting the picture-quality parameters and storing the picture-quality parameters to the storage circuit.

2. The method according to claim 1, wherein the hardware initialization of the television device includes initializing an I/O interface of the television device, a display, and a storage implemented by the storage circuit.

3. The method according to claim 2, wherein the fast start-up procedure includes detecting a signal source of a high-definition multimedia interface connected with the I/O interface, and the picture is generated from image signals received through the high-definition multimedia interface.

4. The method according to claim 1, wherein the picture-quality parameters recorded in the storage circuit are parameter settings of the display of the television device, and the picture-quality parameters include one or any combination of a maximum screen brightness setting, a minimum screen brightness setting, high dynamic range parameters, screen saturation chromaticity parameters, screen gamma curve parameters, screen delay parameters, a screen maximum supporting frequency, a screen definition, a dynamic contrast, a number of regions applied to a local dimming screen backlight, color conversion parameters, and an amplification factor.

5. The method according to claim 4, wherein the picture-quality parameters stored in the storage circuit further include parameters configured by a user for a user interface displayed by the television device.

6. The method according to claim 1, wherein operating services provided by the operating system after the operating system booting procedure is completed, so as to implement a smart TV.

7. A television system, comprising:

a processing circuit;

a display module electrically coupled with the processing circuit; and a storage circuit electrically coupled with the processing circuit and configured to store picture-quality parameters;

wherein the processing circuit is configured to perform steps for fast starting up a television display function operated in the television system, the steps comprising:

turning on a power of a television device that has the television system performing hardware initialization of the television device;

performing a fast start-up procedure and an operating system booting procedure by a processing circuit using different threads or different cores in the television system including loading picture-quality parameters from the storage circuit; and setting up display parameters of the television device with the picture-quality parameters for displaying a picture;

wherein, after the television device completes the operating system booting procedure that enables a kernel of an operating system and is operated, the picture-quality parameters recorded in the storage circuit is formed by operating a parameter-collecting program for collecting the picture-quality parameters and storing the picture-quality parameters to the storage circuit.

8. The television system according to claim 7, wherein the hardware initialization of the television device includes initializing an I/O interface of the television device, a display, and a storage implemented by the storage circuit.

9. The television system according to claim 8, wherein the fast start-up procedure includes detecting a signal source of a high-definition multimedia interface connected with the I/O interface, and the picture is generated from image signals received through the high-definition multimedia interface.

10. The television system according to claim 8, wherein the picture-quality parameters recorded in the storage circuit are parameter settings of the display of the television device, and the picture-quality parameters include one or any combination of a maximum screen brightness setting, a minimum screen brightness setting, high dynamic range parameters, screen saturation chromaticity parameters, screen gamma curve parameters, screen delay parameters, a screen maximum supporting frequency, a screen definition, a dynamic contrast, a number of regions applied to a local dimming screen backlight, color conversion parameters and an amplification factor.

11. The television system according to claim 10, wherein the picture-quality parameters stored in the storage circuit further include parameters configured by a user for a user interface displayed by the television device.

12. The television system according to claim 7, wherein operating services provided by the operating system after the operating system booting procedure is completed, so as to implement a smart TV.

\* \* \* \* \*